United States Patent
Kang et al.

(10) Patent No.: US 8,587,724 B2
(45) Date of Patent: Nov. 19, 2013

(54) DISPLAY APPARATUS AND CONTROL METHOD THEREOF

(75) Inventors: Keun-seok Kang, Suwon-si (KR); Sung-han Lee, Hwaseong-si (KR); Sun-ho Yang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 6 days.

(21) Appl. No.: 13/302,368

(22) Filed: Nov. 22, 2011

(65) Prior Publication Data
US 2012/0224102 A1 Sep. 6, 2012

(30) Foreign Application Priority Data
Mar. 4, 2011 (KR) .......................... 10-2011-0019360

(51) Int. Cl.
*H04N 5/445* (2011.01)
*H04N 5/50* (2006.01)

(52) U.S. Cl.
USPC .......................................... 348/563; 348/569

(58) Field of Classification Search
USPC ........ 348/563, 564, 569, 570; 725/37–40, 59; 345/73–175
IPC .............................................. H04N 5/445,5/50
See application file for complete search history.

(56) References Cited

U.S. PATENT DOCUMENTS

| | | | |
|---|---|---|---|
| 6,002,386 A | 12/1999 | Gu | |
| 8,314,887 B2 * | 11/2012 | Wakisaka | 348/563 |
| 2006/0244863 A1 * | 11/2006 | Baikie et al. | 348/569 |

FOREIGN PATENT DOCUMENTS

WO 2005/071604 A2 8/2005

OTHER PUBLICATIONS

Communication dated Jan. 4, 2012, issued by the European Patent Office in counterpart European Application No. 11186220.7.

* cited by examiner

*Primary Examiner* — Sherrie Hsia
(74) *Attorney, Agent, or Firm* — Sughrue Mion, PLLC

(57) ABSTRACT

Disclosed are a display apparatus and a control method thereof, the display apparatus including: a signal receiver which receives a video signal; an image processor which processes the video signal received by the signal receiver; a display unit which displays an image on the basis of the video signal processed by the image processor; a function selector which senses a user's operation for selecting a plurality of functions provided by the display apparatus; and a controller which displays an on screen display (OSD) menu for selecting the plurality of functions on the display unit in accordance with a user's first operation entering within a predetermined distance from the function selector, and operates one selected among the plurality of functions in accordance with a user's second operation. With this, it is possible to provide an intuitive, convenient and reliable user interface for selecting a plurality of functions even under spatial limitations.

29 Claims, 15 Drawing Sheets

DISPLAY APPARATUS AND CONTROL METHOD THEREOF

CROSS-REFERENCE TO RELATED APPLICATION

This application claims priority from Korean Patent Application No. 10-2011-0019360, filed on Mar. 4, 2011 in the Korean Intellectual Property Office, the disclosure of which is incorporated herein by reference.

BACKGROUND

1. Field

Apparatuses and methods consistent with the exemplary embodiments relate to a display apparatus and a control method thereof, and more particularly, to a display apparatus providing a user interface for selecting a plurality of functions and a control method thereof.

2. Description of the Related Art

A display apparatus such as a television (TV), a monitor for a personal computer (PC), etc. provides a user interface for allowing a user to control operations (hereinafter, referred to as a 'function') to be implemented. The functions of the display apparatus may include power on/off, channel change, screen adjustment, volume control, etc. The user interface for controlling such functions of the display apparatus may be based on a method of using a remote controller, a method of using a control panel, etc. Since the function control of the display apparatus through the user interface may be achieved as a user selects one among a plurality of preset functions of the display apparatus, the 'function control of the display apparatus by a user' is also called 'user's selection for the plurality of functions.'

In the case of a conventional user interface using a control panel, for example, a control panel provided with buttons corresponding to 6 to 8 functions is placed on a front side, a lateral side, a rear side, etc. of the display apparatus. A user may directly press or touch the button of the control panel with a finger or the like in order to select a desired function.

However, with a recent trend of thin and beautiful design, it is increasingly difficult to secure a space for the control panel provided with the plurality of buttons. For example, in the case where the control panel is placed on a front side of the display apparatus, it is difficult to design the control panel due to a trend of making an edge (or a bezel) outside a screen narrow. Although such a control panel can be designed, it is inconvenient for a user to press a small button. Alternatively, even if the control panel is placed on a lateral side of the display apparatus, the thin design may result in the same difficulties as above.

Meanwhile, in the case where the control panel is provided on the lateral side, the rear side, etc. of the display apparatus, there may also be difficulties since a user cannot readily view the control panel in front of the display panel even if there are no spatial limitations, that is, even if the button is sufficiently designed to be large.

Further, in even the case of a touch type control panel using an electrostatic sensor proposed for overcoming the spatial limitation, if it is applied to a metal bezel, reliability deteriorate due to noise.

SUMMARY

Accordingly, one or more exemplary embodiments provide a display apparatus provided with an intuitive, convenient and reliable user interface for selecting a plurality of functions even under spatial limitations, and a control method thereof.

The foregoing and/or other aspects may be achieved by providing a display apparatus including: a signal receiver which receives a video signal; an image processor which processes the video signal received by the signal receiver; a display unit which displays an image on the basis of the video signal processed by the image processor; a function selector which senses a user's operation for selecting a plurality of functions provided by the display apparatus; and a controller which displays an on screen display (OSD) menu for selecting the plurality of functions on the display unit in accordance with a user's first operation entering within a predetermined distance from the function selector, and operates one selected among the plurality of functions in accordance with a user's second operation.

The OSD menu may be displayed at a position corresponding to the function selector.

The function selector may include a proximity sensor for sensing that the user's operation is proximate to the function selector.

The user's second operation may include a touch on the function selector, and the function selector may include a touch sensor for sensing the touch on the function selector.

The controller may stop performing the function if the touch on the function selector is released while performing the function.

The controller may release display of the OSD menu if a predetermined time elapses after stopping performing the function.

The user's second operation may include a pressing operation on the function selector, and the function selector may include a pressing sensor for sensing the pressing operation on the function selector.

The controller may stop performing the function if the pressing operation on the function selector is released while performing the function.

The controller may release display of the OSD menu if a predetermined time elapses after stopping performing the function.

The OSD menu may include a plurality of items corresponding to the plurality of functions, and the controller may highlight one among the plurality of items in accordance with a user's third operation.

The user's third operation may include a touch on the function selector, and the function selector may include a touch sensor for sensing the touch on the function selector.

The function selector may include a function selection panel provided with a plurality of marks indicating the plurality of functions, and the plurality of items of the OSD menu may be positioned corresponding to the plurality of marks on the function selection panel.

The controller may release display of the OSD menu if the user's operation gets out of the predetermined distance from the function selector.

The size of the OSD menu may correspond to a screen size of the display unit.

The function selector may be provided on one of a front side, a lateral side, a rear side, a top side and a bottom side of the display apparatus.

Another aspect may be achieved by providing a method of controlling a display apparatus which receives and processes a video signal to be displayed as an image, the method including: sensing a user's operation; displaying an on screen display (OSD) menu for selecting a plurality of functions provided by the display apparatus on a display unit in accordance with a user's first operation entering within a predetermined distance from a function selector provided in the display apparatus; and operating one selected among the plurality of functions in accordance with a user's second operation.

The OSD menu may be displayed at a position corresponding to the function selector.

The sensing may include sensing that the user's operation is proximate to the function selector.

The user's second operation may include a touch on the function selector, and the sensing may include sensing the touch on the function selector.

The method may further include stopping performing the function if the touch on the function selector is released while performing the function.

The method may further include releasing display of the OSD menu if a predetermined time elapses after stopping performing the function.

The user's second operation may include a pressing operation on the function selector, and the sensing may include sensing the pressing operation on the function selector.

The method may further include stopping performing the function if the pressing operation on the function selector is released while performing the function.

The method may further include releasing display of the OSD menu if a predetermined time elapses after stopping performing the function.

The OSD menu may include a plurality of items corresponding to the plurality of functions, and the displaying may include highlighting one among the plurality of items in accordance with a user's third operation.

The user's third operation may include a touch on the function selector, and the sensing may include sensing the touch on the function selector.

The function selector may include a function selection panel provided with a plurality of marks indicating the plurality of functions, and the plurality of items of the OSD menu may be positioned corresponding to the plurality of marks on the function selection panel.

The method may further include releasing display of the OSD menu if the user's operation gets out of the predetermined distance from the function selector.

The size of the OSD menu may correspond to a screen size of the display unit.

In another embodiment, there is a display apparatus including: a receiver which receives a video signal; an image processor which processes the video signal received by the receiver; a display unit which displays an image based on the processed video signal; a function selector which is operable to sense an operation of a user selecting one of a plurality of functions provided by the display apparatus; and a controller which displays an on screen display (OSD) menu which displays the plurality of functions, on the display unit in accordance with a first user operation entering within a predetermined distance from the function selector, and operates the selected one of the plurality of functions in accordance with a second user operation.

In yet another embodiment, there is a method of controlling a display apparatus which receives and processes a video signal to be displayed as an image, the method including: sensing an operation of a user; displaying an on screen display (OSD) menu which displays a plurality of functions provided by the display apparatus, on a display unit in accordance with a first user operation entering within a predetermined distance from a function selector provided in the display apparatus; and operating the selected one of the plurality of functions in accordance with a second user operation.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings.

Figure 1:
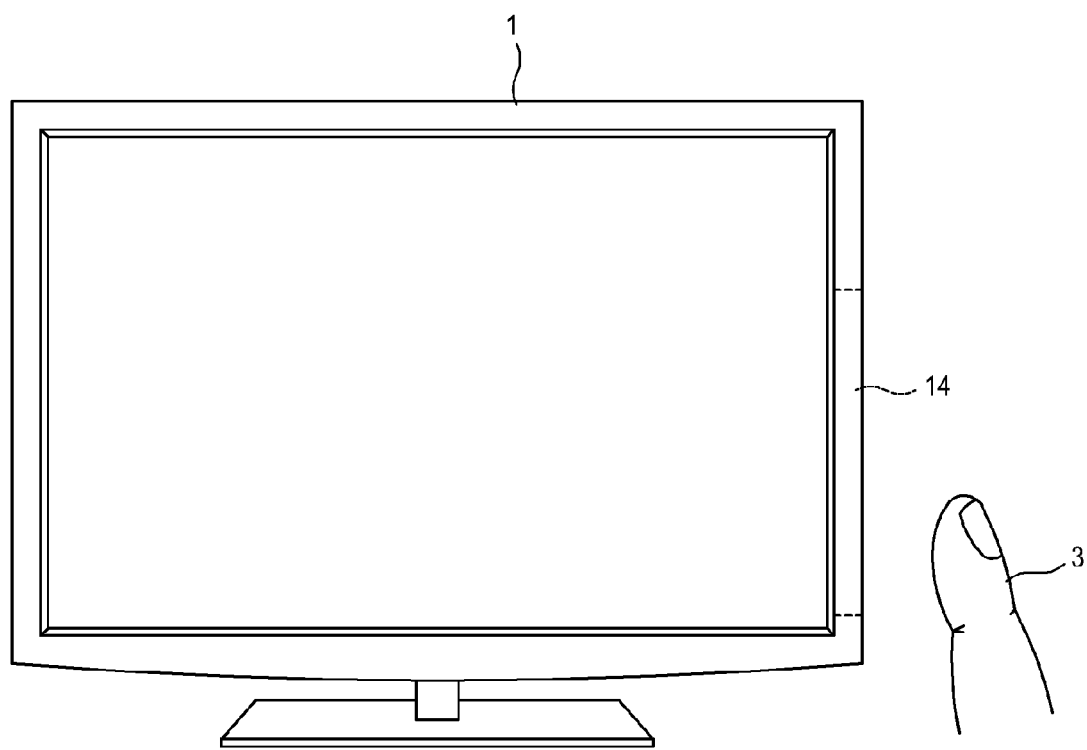
FIG. 1 shows a display apparatus according to an exemplary embodiment.

FIG. 1 shows a display apparatus 1 according to an exemplary embodiment. The display apparatus 1 shown in FIG. 1 is a television (TV). However, the display apparatus is not limited to the TV, but includes any imaging or a display device which can perform a plurality of functions and provide a user interface for the functions or for operating the device.

Figure 2:
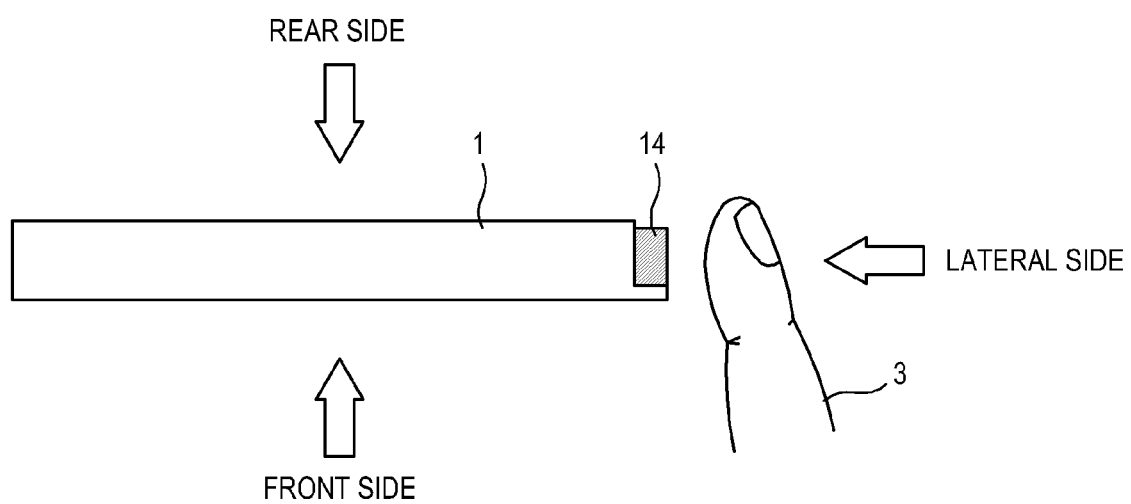
FIG. 2 is a top view of the display apparatus of FIG. 1.

The display apparatus 1 performs a plurality of functions such as power on or off, screen adjustment, etc., as well as image display. The display apparatus 1 includes a user interface 14 for allowing a user to select the plurality of functions, e.g., for receiving user input. The user interface 14 may be provided on a front side (FIG. 1), a lateral side (FIG. 2) or the like of the display apparatus 1. FIG. 2 is a top view of the display apparatus of FIG. 1. A user can select a desired function among the plurality of functions with a finger 3 or the like through the user interface 14. The user interface 14 will be also called a 'function selector' in that a user selects a desired function among the plurality of functions. FIG. 2 show that the user interface 14 is placed on the lateral side of the display apparatus 1, but not limited thereto. Alternatively, the user interface 14 may be placed on a rear side, a top side, a bottom side, a front side, or etc. of the display apparatus 1.

Figure 3:
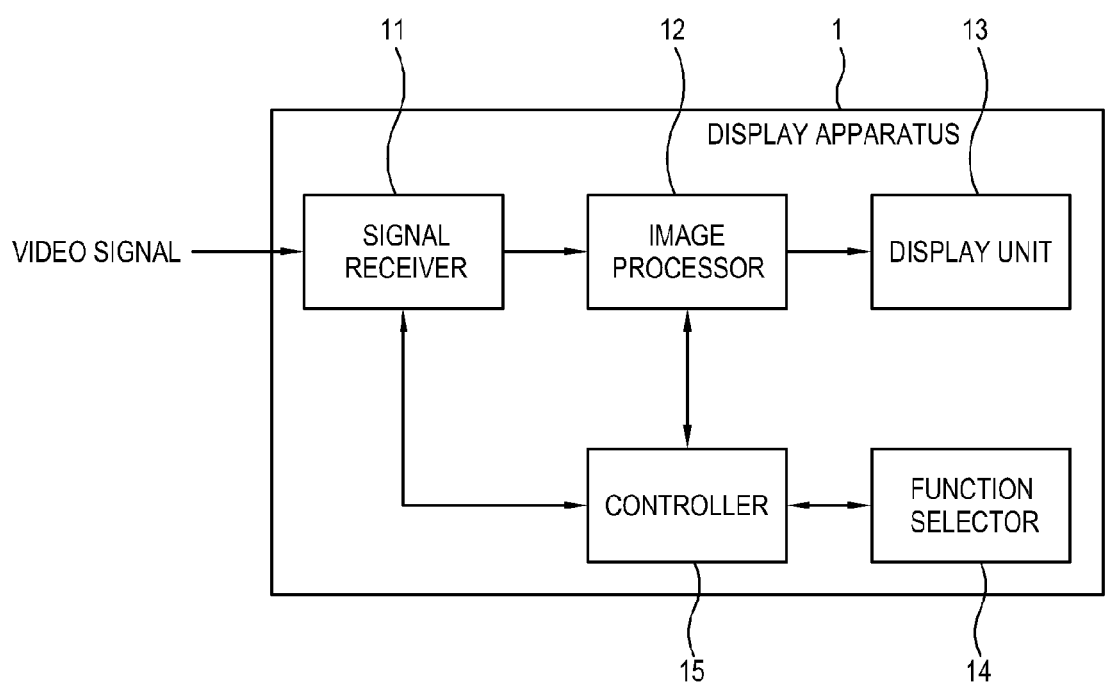
FIG. 3 is a block diagram showing a configuration of the display apparatus of FIG. 1.

FIG. 3 is a block diagram showing a configuration of the display apparatus of FIG. 1. The display apparatus 1 includes a signal receiver 11, an image processor 12, a display unit 13, a function selector 14, and a controller 15. The signal receiver 11 may include a video signal containing an image. The video signal may include audio and/or data as well as the image. The video signal received by the signal receiver 11 includes a broadcasting signal transmitted from a broadcasting station, and a signal input from a predetermined imaging device (not shown) or a video output device. In the case of the broadcasting signal, the signal receiver 11 may selectively receive the broadcasting signal corresponding to one channel among plural channels. The broadcasting signal may include any type of signal from known broadcasting such as public broadcasting, cable broadcasting, satellite broadcasting, etc. Also, the broadcasting signal may include a digital broadcasting signal and an analog broadcasting signal. The signal receiver 11 may perform signal processing for obtaining video contents or the like from the received broadcasting signal. Such signal processing includes tuning, analog-digital conversion, demodulation, digital-analog conversion, etc.

Receiving a video signal input from the imaging device, the signal receiver 11 may communicate with the imaging device transmitting the video signal in accordance with the characteristics of the input video signal. Such communication includes wired communication and wireless communication, and includes analog communication and digital communication. Also, a communication method includes any type of communication method known as being used for transmitting the video contents. There is no limit to the kind of imaging device for providing a video signal to the signal receiver 11. For example, the imaging device includes a digital versatile disc (DVD) player, a Blu-ray disc (BD) player, a personal computer (PC), a mobile phone, a smart phone, other TVs, etc. The signal receiver 11 may perform the signal processing for obtaining an image from the input video signal. Such signal processing includes the analog-digital conversion, digital-analog conversion, etc.

Further, the signal receiver 11 may receive a video signal from a predetermined server through a network, or receive a video signal from a portable storage device such as a universal serial bus (USB) storage medium. In each case, the signal receiver 11 may perform given communication with another device in order to receive a video signal. In either case, the signal receiver 11 can receive and process the video signal under control of the controller 15.

The image processor 12 performs predetermined image processing so that an image obtained from the video signal received by the signal receiver 11 can be displayed. The image processing includes demultiplexing, decoding, scaling, picture quality adjustment, picture quality enhancement, etc. Also, the image processor 12 can process an image related to an on screen display (OSD) menu to display a plurality of function and for allowing a user to select the plurality of functions. The image processor 12 may process an image based on the video signal to be overlapped with or to be placed in parallel with at least a portion of each image based on the OSD menu on one screen.

The display unit 13 displays an image processed by the image processor 12. There is no limit as to how the display unit 13 displays an image, and includes all known displaying methods. Such a displaying method may be based on a liquid crystal display (LCD), an organic light emitting diode (OLED), a plasma display panel (PDP), a projection, a cathode ray tube (CRT), etc.

The function selector 14 is for inputting a user's selection with regard to the plurality of functions, e.g., for receiving user input or user selection regarding one or more of the plurality of functions.

The controller 15 controls a general operation of the display apparatus 1. The controller 15 displays the OSD menu (see '132' of FIG. 10) for selecting the plurality of functions in accordance of operations of a user who enters within a predetermined distance from the function selector 14. Also, the controller 15 controls respective elements so that one of the plural functions can be implemented in accordance with a user's selection input through the function selector 14.

Although it is not shown, the controller 15 includes a non-volatile memory where a program for the foregoing control is stored, a volatile memory where at least a part of the program stored in the non-volatile memory is loaded, and a microprocessor or a microcontroller unit for executing the program loaded into the volatile memory.

Although it is not shown, the display apparatus 1 may further include other elements needed for operations of the display apparatus 1. For example, the display apparatus 1 may include an audio signal receiver such as a microphone or the like for receiving an audio signal, an audio signal processor for processing an audio signal, an audio output unit such as a loudspeaker or the like for outputting an audio signal, a remote signal receiver for receiving a remote signal for operation control from a remote controller (not shown), a storage unit such as an electrically erasable and programmable read only memory (EEPROM), a flash memory, a hard disk drive or the like for storing information or data about the operation, a power supply for supplying power needed for operation of each element, etc.

Figure 4:
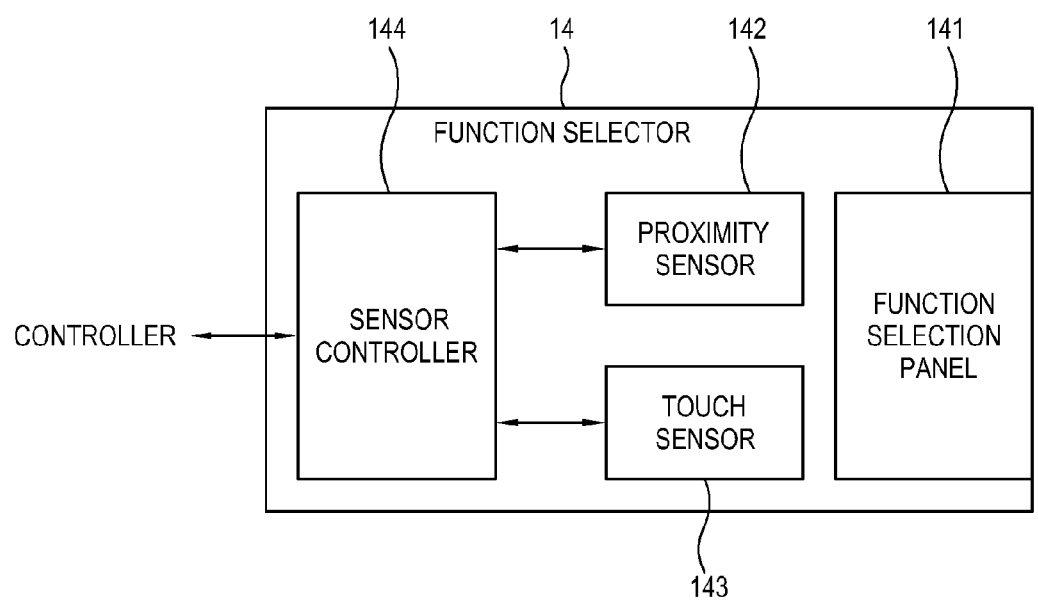
FIG. 4 is a block diagram showing a configuration of a function selector shown in FIG. 3.
Figure 5:
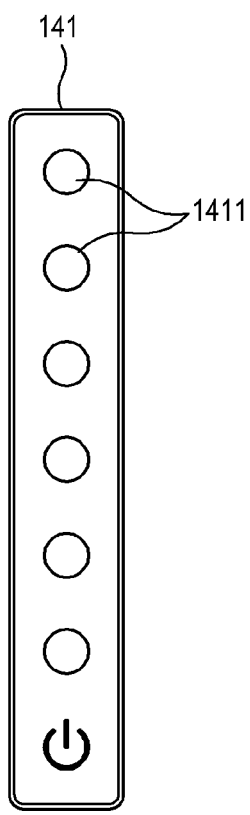
FIG. 5 shows an example of a function selection panel shown in FIG. 4.

FIG. 4 is a block diagram showing a configuration of the function selector 14 shown in FIG. 3. The function selector 14 includes a function selection panel 141, a proximity sensor 142, a touch sensor 143, and a sensor controller 144. The function selection panel 141 is provided outside the display apparatus 1, and allows operation of a user for selecting a function on the function selection panel 141. FIG. 5 shows an example of the function selection panel 141 shown in FIG. 4. As shown in FIGS. 1 and 2, the function selection panel 141 is shaped like a rectangular mountable panel extending in a lateral direction of the display apparatus 1 so that it can be provided on the lateral side of the display apparatus 1. The function selection panel 141 may includes a plurality of marks 1411 corresponding to at least a part of the plurality of functions in order to select the plurality of functions. The plurality of marks 1411 is provided to be visibly recognized by a user. For example, the plurality of marks 1411 may be achieved by depressing or embossing the surface of the function selection panel 141, printing, a sticker, a lamp, etc.

Figure 6:
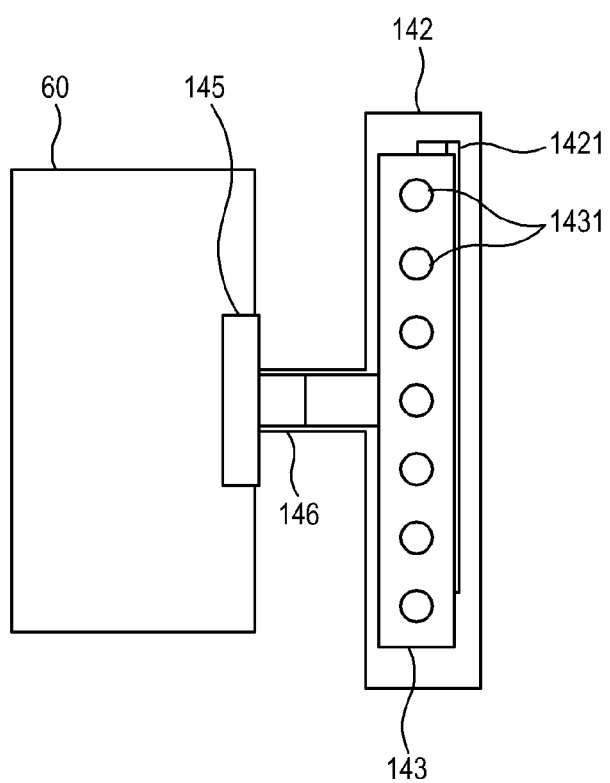
FIG. 6 shows an example of a proximity sensor and a touch sensor shown in FIG. 4.

FIG. 6 shows an example of the proximity sensor 142 and the touch sensor 143 shown in FIG. 4. The proximity sensor 142 senses or detects that an operation of a user is proximate to the function selection panel 141. For example, the proximity sensor 142 can sense whether a user's finger or the like enters within a predetermined distance from the function selection panel 141. The proximity sensor 142 may include a pattern type sensing unit 1421 for sensing a proximate operation of a user. The touch sensor 143 senses a touching operation of a user on the function selection panel 141. The touch sensor 143 may include a plurality of sensing points 1431 corresponding to at least a part of the plurality of functions. The plurality of sensing points 1431 corresponds to the plurality of marks 1411 on the function selection panel 141. The touch sensor 143 can sense which one of the plurality of marks 1411 is touched by a user through the plurality of sensing point 1431.

The proximity sensor 142 and the touch sensor 143 may be achieved in the form of a mountable substrate as a flexible printed circuit board (FPCB) or the like film, layer, etc. The proximity sensor 142 and the touch sensor 143 may be filed up with each other.

The respective signal lines of the proximity sensor 142 and the touch sensor 143 are connected to a PCB 60 provided in the display apparatus 1 via a connector 145. The sensor controller 144 may be provided in the PCB 60, and controls operations of the proximity sensor 142 and the touch sensor 143. The sensor controller 144 transmits signals from the proximity sensor 142 and the touch sensor 143 to the controller 15. Communication between the sensor controller 144 and the controller 15 may include I2C, UART, Serial communication, or all known communication methods.

Figure 7:
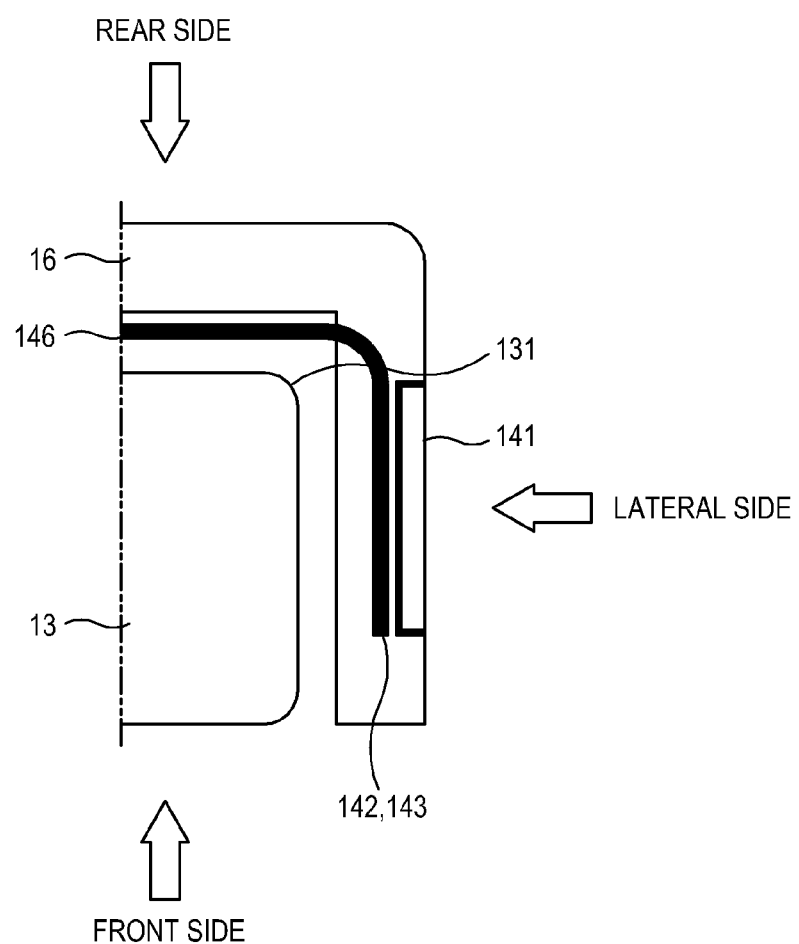
FIG. 7 shows placement of the function selector shown in FIGS. 4 to 6.

FIG. 7 shows placement of the function selector 14 shown in FIGS. 4 to 6. FIG. 7 is a cross-section view of the display apparatus 1 from above. A reference numeral of 13 indicates a panel type display unit, and a reference numeral of 16 indicates a cover for protecting the display apparatus 1. The function selection panel 141, the proximity sensor 142 and the touch sensor 143 are provided in a space penetrating a lateral side of the cover 16. Like the cover 16, the function selection panel 141 is provided to form an outer appearance of the display apparatus 1. The proximity sensor 142 and the touch sensor 143 are provided as being piled up on, i.e., stacked behind, a rear side of the function selection panel 141. Signal line parts of the proximity sensor 142 and the touch sensor 143 are bent at a corner 131 of the display unit 13 and connected to the connector 145 shown in FIG. 6.

Figure 8:
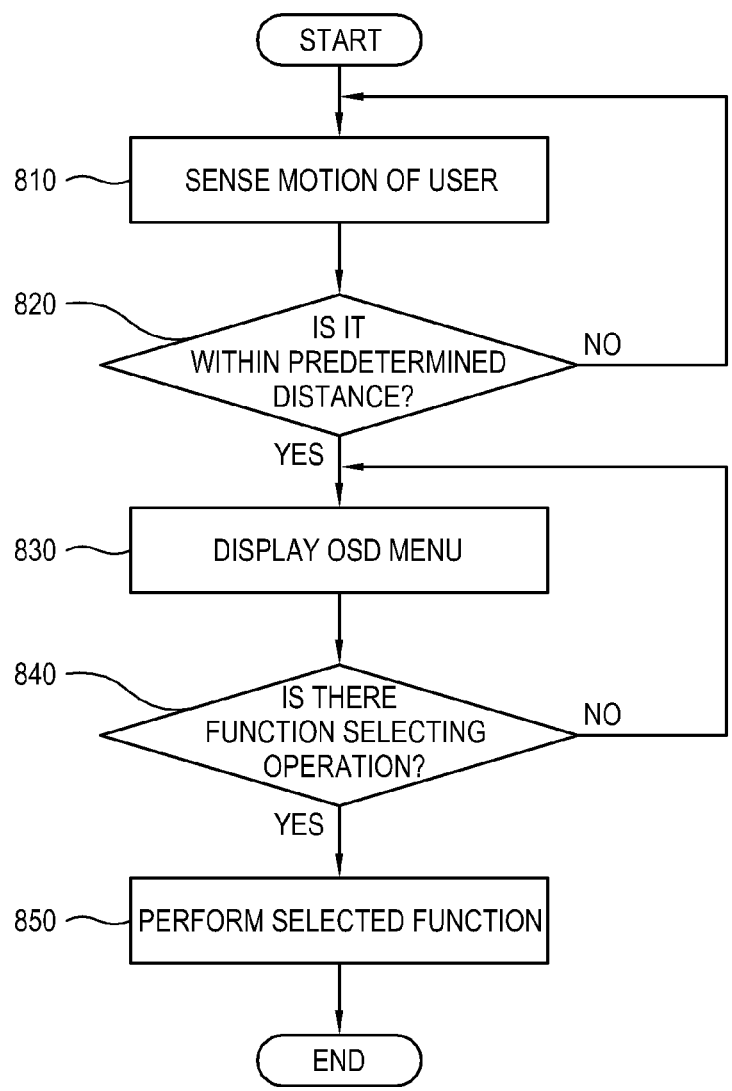
FIG. 8 is a flowchart showing operations of the display apparatus shown in FIG. 1.

FIG. 8 is a flowchart showing operations of the display apparatus 1 shown in FIG. 1. The operation of the display apparatus 1 shown in FIG. 8 may be controlled by the controller 15 shown in FIG. 3.

Figure 9:
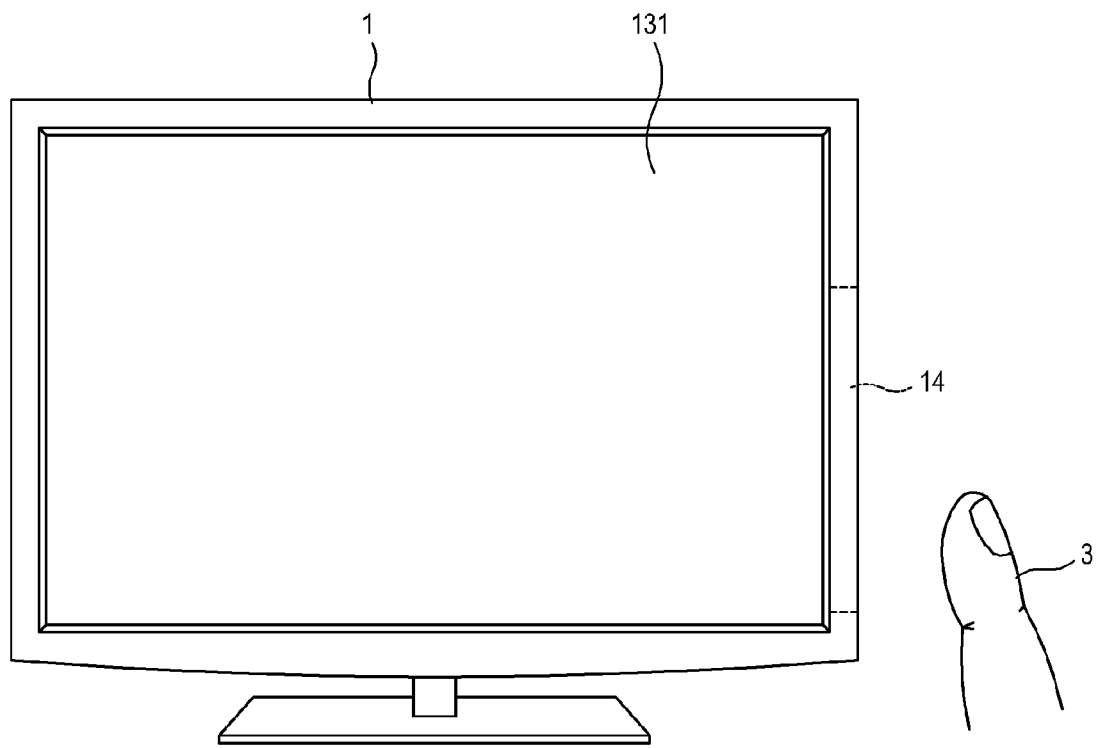
FIG. 9 shows the display apparatus corresponding to the operations 810 and 820 of FIG. 8.

At operation 810, the display apparatus 1 senses a user's operation. At operation 820, the display apparatus 1 ascertains whether a user's operation enters within a predetermined distance. FIG. 9 shows the display apparatus 1 corresponding to the operations 810 and 820 of FIG. 8. Referring to FIG. 9, a user's finger 3 is away from the function selection unit 14 at a predetermined distance or more. The proximity sensor 142 senses what distance a user's operation is away from the function selector 14. If a user's operation does not come inside from the outside of a boundary at a predetermined distance from the function selector 14 (refer to No in the operation 820), the OSD menu for selecting a plurality of functions is not displayed on the screen 131 of the display unit 13. For example, the predetermined distance from the function selector 14 may be several centimeters, and includes a limit distance for substantially sensing a user's operation. In an exemplary embodiment, the user's operation may involve a movement of the user's finger or hand so that the proximity sensor 142 senses whether the user's finger or hand is within a predetermined distance from the function selector 14.

Figure 10:
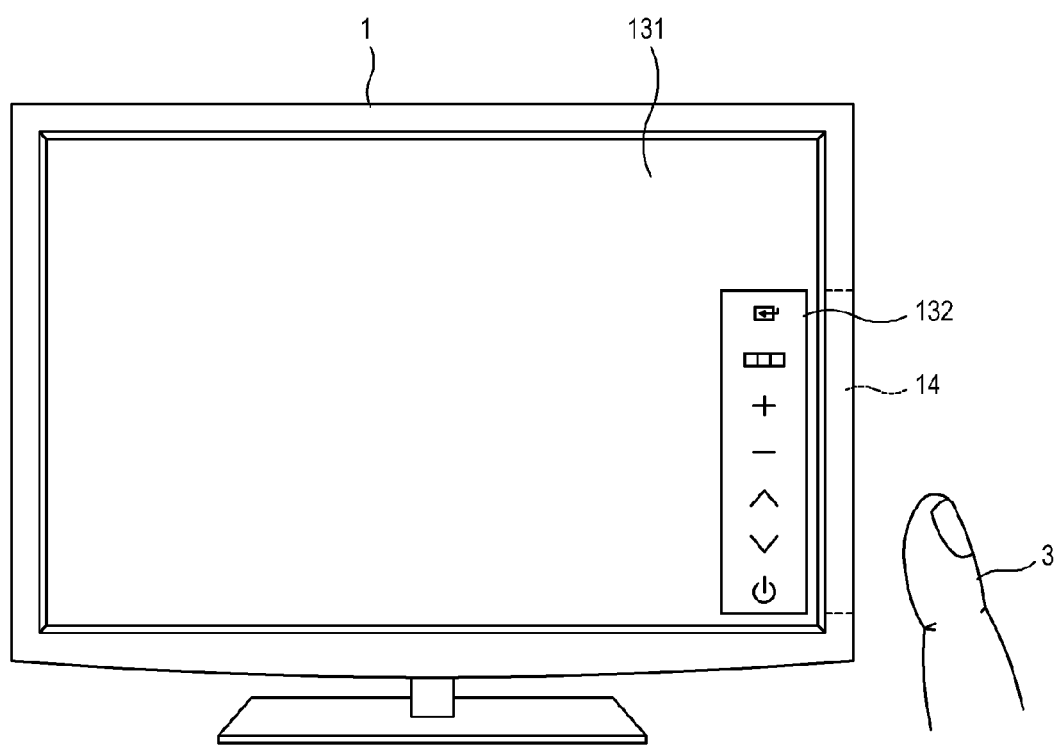
FIG. 10 shows the display apparatus corresponding to the operation 830 of FIG. 8.

If a user's operation enters within a predetermined distance from the function selector 14 (refer to Yes in the operation 820), the display apparatus 1 displays the OSD menu for selecting the plurality of functions at operation 830. FIG. 10 shows the display apparatus 1 corresponding to the operation 830 of FIG. 8. Referring to FIG. 10, a user's finger 3 is within the predetermined distance from the function selector 14. If the proximity sensor 142 senses that a user's operation comes inside from the outside of a boundary at a predetermined distance from the function selector 14, the OSD menu 132 is displayed on a screen 131 of the display unit 13. The OSD menu 132 is positioned corresponding to the function selector 14 to be intuitively recognized by a user. The size of the OSD menu 132 may correspond to the size of the screen 131 of the display unit 13. Information about the size of the screen 131 of the display unit 13 may be stored in a predetermined storage unit, and the controller 15 may determine the size of the OSD menu 132 on the basis of the stored information.

Figure 11:
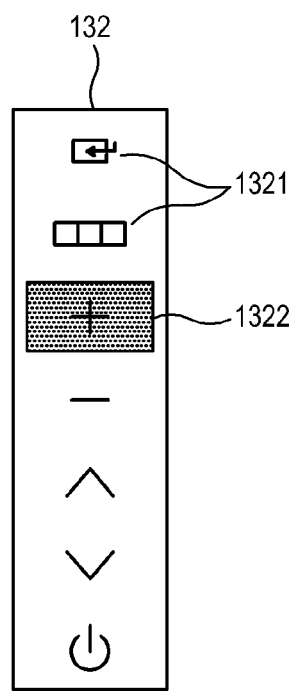
FIG. 11 shows a specific example of an on screen display (OSD) menu shown in FIG. 10.

FIG. 11 shows a specific example of the OSD menu 132 shown in FIG. 10. The OSD menu 132 may include a plurality of items 1321 corresponding to at least a part of the plurality of functions. The plurality of items 1321 and there positions may correspond to the plurality of marks 1411 of the function selection panel 141 shown in FIG. 5 so that a user can intuitively adjust them.

Figure 12:
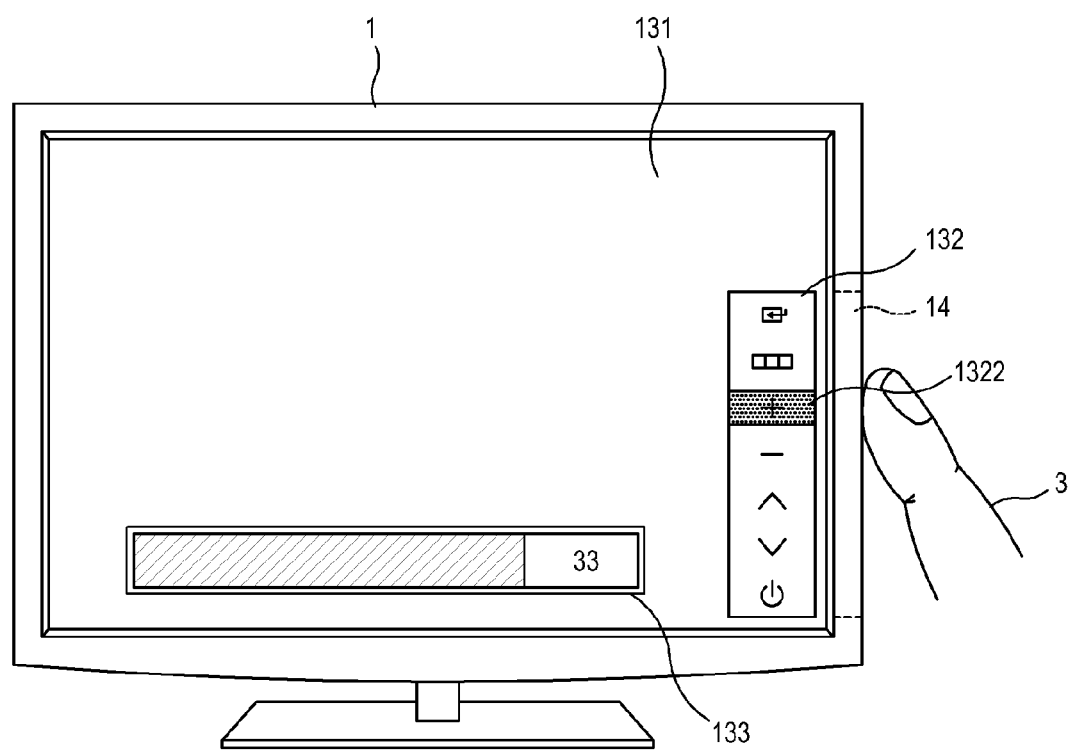
FIG. 12 shows the display apparatus corresponding to the operations 840 and 850 of FIG. 8.

Referring back to FIG. 8, in operation 840, the display apparatus 1 continues to sense a user's operation and determines whether there is a user's selection of at least one of the plurality of functions (hereinafter, referred to as a 'function selecting operation'). For example, the function selecting operation may be touching the function selector 14. If there is a touch on the function selector 14 (Yes in the operation 840), the display apparatus 1 performs a corresponding function at operation 850. FIG. 12 shows the display apparatus 1 corresponding to the operations 840 and 850 of FIG. 8. Referring to FIG. 12, a user's finger 3 is touching the function selector 14. The touch sensor 143 senses a user's touch on the function selector 14. At this time, one item 1322 among the plurality of items of the OSD menu 132 corresponding to a user's touch may be highlighted to be intuitively recognizable by a user. A function corresponding to a user's touch among the plurality of functions, e.g., a volume may be turned up as shown in item 1322 in FIG. 12. In this case, a sub ODD menu 133 corresponding to the performed function may be further displayed on the screen 131 of the display unit 13.

The display apparatus 1 continues to sense the user's operation, and may perform a corresponding function if a user's function selecting operation is changed. For example, if a user slides his/her finger 3 up or down on the function selector 14, at least one among the plural items of the OSD menu 132 may be sequentially highlighted corresponding to the positions touched by the sliding finger 3. If a user's finger 3 stops, a function corresponding to a stopped position may be performed.

With this display apparatus 1, a user can intuitively and readily select a function through the OSD menu 132. Also, the OSD menu 132 is displayed only when a user selects a function, so that a bezel width or the like can be freely designed. Further, a user has no need for ascertaining the functions through the exterior of the function selector 14, and thus limitations in designing the function selector 14 is decreased.

Figure 13:
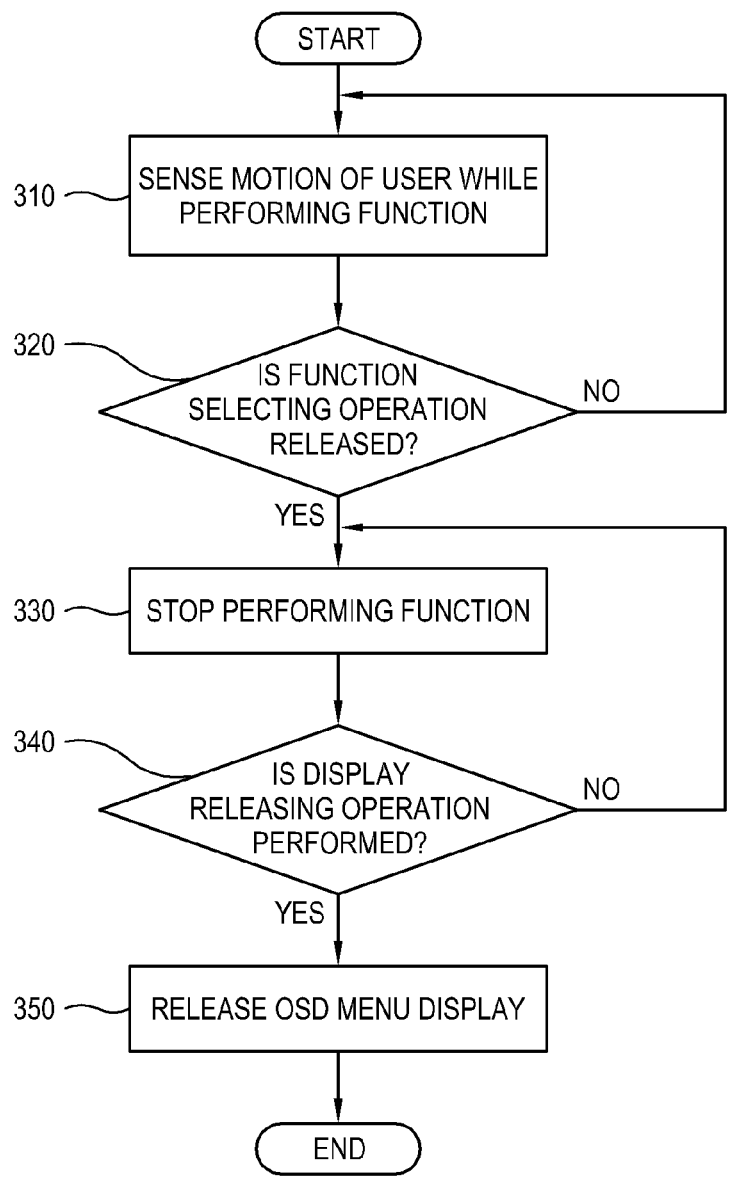
FIG. 13 is a flowchart showing another example of operations of the display apparatus shown in FIG. 1.

FIG. 13 is a flowchart showing another example of operations of the display apparatus 1 shown in FIG. 1. The operation of the display apparatus 1 shown in FIG. 13 may be controlled by the controller 15 shown in FIG. 3. Regarding FIG. 13, the display apparatus 1 being in a state corresponding to the operation 850 shown in FIG. 8, is assumed.

Figure 14:
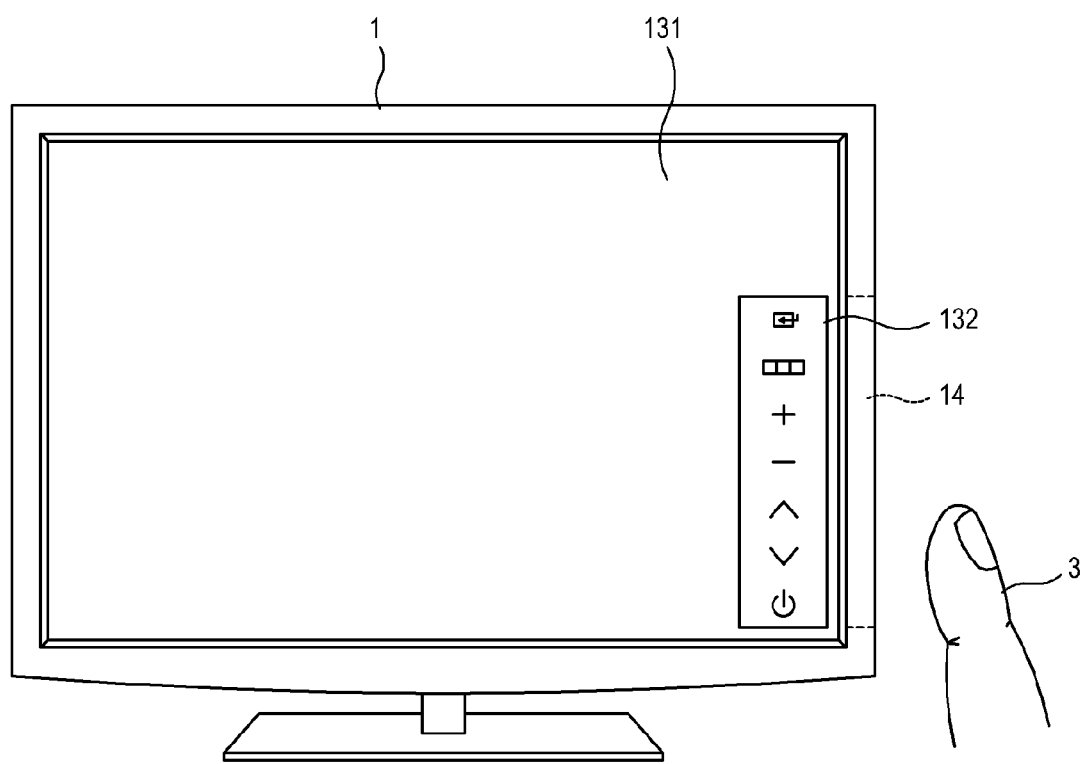
FIG. 14 shows the display apparatus corresponding to the operations 310 and 320 of FIG. 13.

At operation 310, the display apparatus 1 senses a user's operation while performing a function based on a user's function selecting operation. At operation 320, the display apparatus 1 ascertains whether a user's function selecting operation is released. For example, the release of the function selecting operation may be an end of a user's touching operation on the function selector 14. FIG. 14 shows the display apparatus corresponding to the operations 310 and 320. Referring to FIG. 14, a user's finger 3 is away from the function selector 14. The touch sensor 143 senses whether the touching operation on the function selector 14 ends. If the function selecting operation is released (Yes in the operation 320), the display apparatus 1 stops performing the corresponding function at operation 330. Also, the highlight for the corresponding item 1321 of the OSD menu 132 is released, i.e., the highlight no longer appears. Further, the sub OSD menu of the corresponding function disappears.

Figure 15:
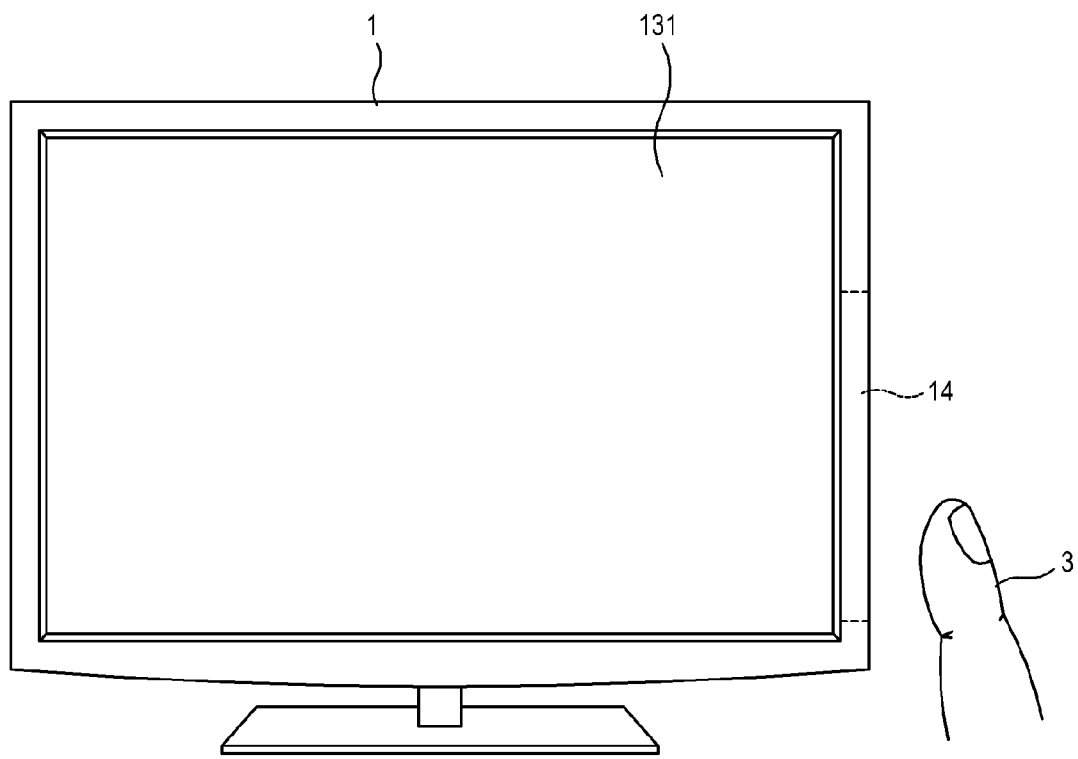
FIG. 15 shows the display apparatus corresponding to the operation 350 of FIG. 13.

Referring back to FIG. 13, at operation 340, while stopping performing the function, the display apparatus 1 ascertains whether a user's operation corresponding to display release of the OSD menu 132 (hereinafter, referred to as a 'display releasing operation') is performed. For example, the display releasing operation may be lapse of predetermined time after stopping performing the function. If a user's display releasing operation happens (Yes in the operation 340), the display apparatus 1 releases the display of the OSD menu 132 at operation 350. FIG. 15 shows the display apparatus 1 corresponding to the operation 350 of FIG. 13. For example, if a predetermined time elapses after stopping performing the function, the OSD menu is not displayed as shown in FIG. 15.

According to another exemplary embodiment, the display releasing operation may be a user's operation that goes beyond a predetermined distance from the function selector 14. In this case, in the state based on the operation 330 in FIG. 13, the operation 350 of FIG. 13 may be performed if the proximity sensor 142 senses that a user's operation comes outside from the inside of the boundary at a predetermined distance from the function selector 14.

The display apparatus 1 shown in FIGS. 3 to 15 employs two sensors, i.e., the proximity sensor 142 and the touch sensor 143 to sense a user's operation, but not limited thereto. Alternatively, one sensor may be used for sensing a user's proximate and touching operations.

In the above exemplary embodiments, the highlight of the item corresponding to the selected function and the implementation of the selected function are achieved by one operation, e.g., the touching operation on the function selector 14, but not limited thereto. Alternatively, if there is a user's touching operation, a corresponding function may be highlighted, and subsequently if there is a user's different operation, the corresponding function may be performed. Here, the user's different operation may be that the corresponding touch is continued for a predetermined time. Also, the user's different operation may be an additional touching operation. Further, the user's different operation may be a user's pressing operation corresponding to a selected (highlighted) function. In this case, the function selector 14 may additionally include a sensor (not shown) for sensing the user's pressing operation. Likewise, such an alternative exemplary embodiment may be applied to release of the function selecting operation and the display releasing operation.

As described above, there are provided a display apparatus provided with an intuitive, convenient and reliable user interface for selecting a plurality of functions even under spatial limitations, and a control method thereof.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
a receiver which receives a video signal;
an image processor which processes the video signal received by the receiver;
a display unit which comprises a screen for displaying an image based on the processed video signal;
a function selector which is operable to sense an operation of a user selecting one of a plurality of functions provided by the display apparatus and is provided in a location outside of the screen; and
a controller which displays an on screen display (OSD) menu which displays the plurality of functions, on the screen in accordance with a first user operation entering within a predetermined distance from the function selector, and operates the selected one of the plurality of functions in accordance with a second user operation.

2. The display apparatus according to claim 1, wherein the OSD menu is displayed at a position corresponding to the function selector.

3. The display apparatus according to claim 1, wherein the function selector comprises a proximity sensor which senses that the operation of the user is proximate to the function selector.

4. The display apparatus according to claim 1, wherein
the second user operation comprises a touch on the function selector, and
the function selector comprises a touch sensor which senses the touch on the function selector.

5. The display apparatus according to claim 4, wherein the controller stops performing the selected one of the plurality of functions if the touch on the function selector ends while the selected one of the plurality of functions is being performed.

6. The display apparatus according to claim 5, wherein the controller stops displaying the OSD menu if a predetermined time elapses after stopping performing the function.

7. The display apparatus according to claim 1, wherein
the second user operation comprises a pressing operation on the function selector, and
the function selector comprises a sensor which senses the pressing operation on the function selector.

8. The display apparatus according to claim 7, wherein the controller stops performing the selected one of the plurality of functions if the pressing operation on the function selector ends while performing the selected one of the plurality of functions.

9. The display apparatus according to claim 7, wherein the controller stops displaying the OSD menu if a predetermined time elapses after stopping performing the selected one of the plurality of functions.

10. The display apparatus according to claim 1, wherein the OSD menu comprises a plurality of items corresponding to the plurality of functions, and
the controller highlights one of the plurality of items in accordance with a third user operation.

11. The display apparatus according to claim 10, wherein
the third user operation comprises a touch on the function selector, and
the function selector comprises a touch sensor which senses the touch on the function selector.

12. The display apparatus according to claim 10, wherein the function selector comprises a function selection panel provided with a plurality of marks indicating the plurality of functions, and
the plurality of items of the OSD menu are positioned corresponding to the plurality of marks on the function selection panel.

13. The display apparatus according to claim 1, wherein the controller stops displaying the OSD menu if there is a user operation which goes beyond a predetermined distance from the function selector.

14. The display apparatus according to claim 1, wherein a size of the OSD menu corresponds to a screen size of the screen.

15. The display apparatus according to claim 1, wherein the function selector is provided on one of a front side, a lateral side, a rear side, a top side and a bottom side of the display apparatus.

16. A method of controlling a display apparatus which receives and processes a video signal to be displayed as an image, the method comprising:
sensing an operation of a user;
displaying an on screen display (OSD) menu which displays a plurality of functions provided by the display apparatus, on a screen of display unit in accordance with a first user operation entering within a predetermined distance from a function selector provided in the display apparatus; and
operating the selected one of the plurality of functions in accordance with a second user operation,
wherein the function selector is provided in a location outside of the screen for displaying the image.

17. The method according to claim 16, wherein the OSD menu is displayed at a position corresponding to the function selector.

18. The method according to claim 16, wherein the sensing comprises sensing that the operation of the user is proximate to the function selector.

19. The method according to claim 16, wherein
the second user operation comprises a touch on the function selector, and
the sensing comprises sensing the touch on the function selector.

20. The method according to claim 19, further comprising stopping performing the selected one of the plurality of functions if the touch on the function selector ends while performing the selected one of the plurality of functions.

21. The method according to claim 20, further comprising stopping the displaying of the OSD menu if a predetermined time elapses after stopping performing the selected one of the plurality of functions.

22. The method according to claim 16, wherein
the second user operation comprises a pressing operation on the function selector, and
the sensing comprises sensing the pressing operation on the function selector.

23. The method according to claim 22, further comprising stopping performing the selected one of the plurality of functions if the pressing operation on the function selector ends while performing the selected one of the plurality of functions.

24. The method according to claim 23, further comprising stopping displaying of the OSD menu if a predetermined time elapses after stopping performing the selected one of the plurality of functions.

25. The method according to claim 16, wherein the OSD menu comprises a plurality of items corresponding to the plurality of functions, and
the displaying comprises highlighting one of the plurality of items in accordance with a third user operation.

26. The method according to claim 25, wherein
the third user operation comprises a touch on the function selector, and
the sensing comprises sensing the touch on the function selector.

27. The method according to claim 25, wherein the function selector comprises a function selection panel provided with a plurality of marks indicating the plurality of functions, and
the plurality of items of the OSD menu are positioned corresponding to the plurality of marks on the function selection panel.

28. The method according to claim 16, further comprising stopping the displaying of the OSD menu if the operation of the user goes beyond the predetermined distance from the function selector.

29. The method according to claim 16, wherein a size of the OSD menu corresponds to a screen size of the display unit.

* * * * *